United States Patent [19]
Morrison

[11] 3,878,796
[45] Apr. 22, 1975

[54] PLASTIC PALLET ASSEMBLY

[75] Inventor: Thomas Morrison, Fair Haven, Granville Middleton, Trenton, N.J.

[73] Assignee: Econopal Inc., Marlboro, N.J.

[22] Filed: Dec. 5, 1973

[21] Appl. No.: 421,962

[52] U.S. Cl. .............................................. 108/56
[51] Int. Cl. .......................................... B65d 19/12
[58] Field of Search ............... 108/51, 56; 403/346

[56] References Cited
UNITED STATES PATENTS

| | | | |
|---|---|---|---|
| 1,420,099 | 6/1922 | Hauser | 403/346 X |
| 3,469,542 | 9/1969 | Ahlenius | 108/56 |
| 3,654,877 | 4/1972 | Barrett | 108/56 |

*Primary Examiner*—James C. Mitchell

[57] ABSTRACT

A knock-down, plastic pallet comprises spaced longitudinal stringers and boards extending transversely of the stringers. The stringers and boards are held in interlocked relationship by an arrangement of integral notches and shoulders.

5 Claims, 6 Drawing Figures

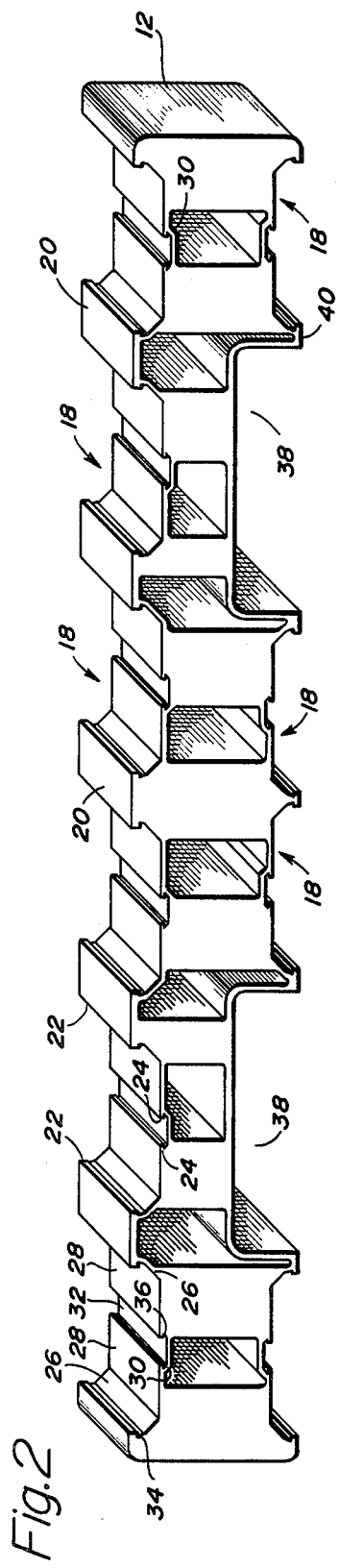
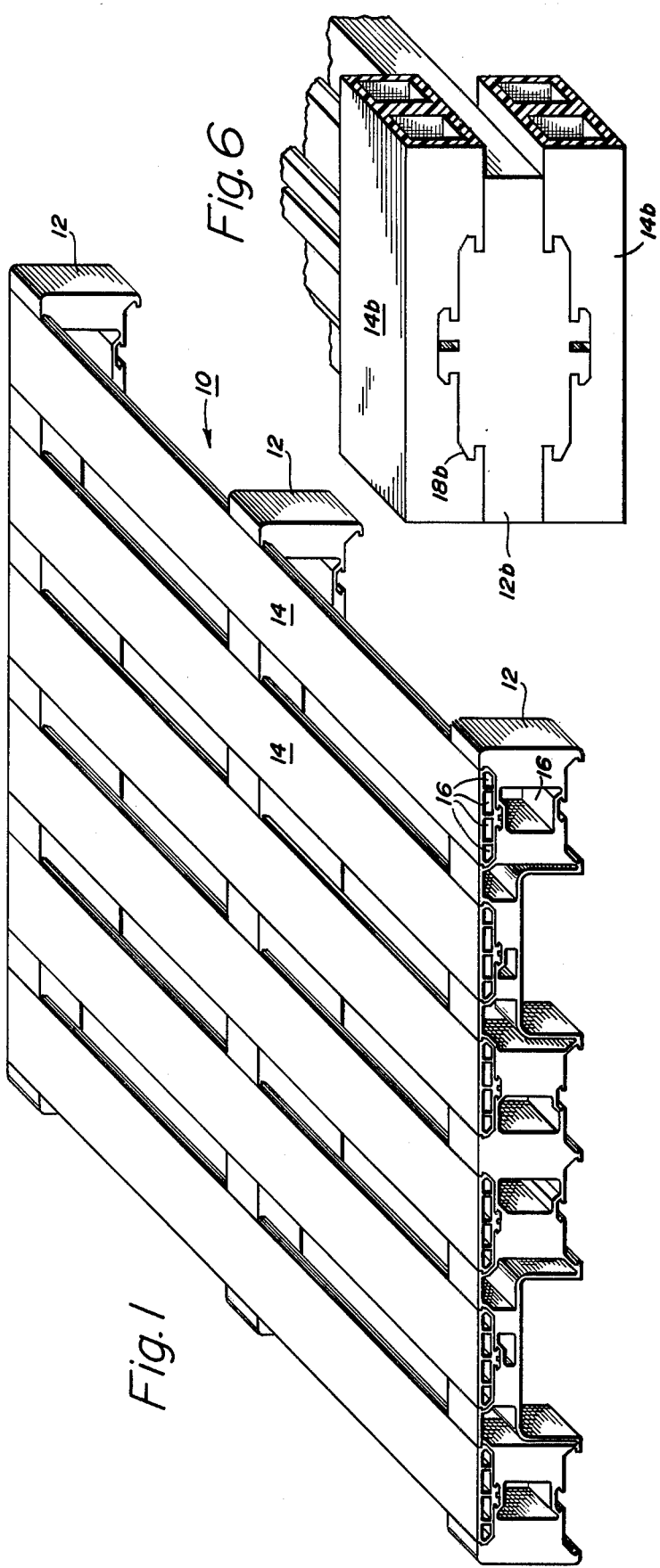

PLASTIC PALLET ASSEMBLY

BACKGROUND OF THE INVENTION

Due to the limited supply of wood, there is a growing need for a durable, plastic pallet capable of being fabricated in sections. These sections should be such as to facilitate shipping and assembly.

SUMMARY OF THE INVENTION

It is an object of this invention to provide a durable, plastic pallet capable of being used in the same manner as a wooden pallet.

It is another object of this invention to provide a plastic pallet comprising sections which can be assembled and disassembled with a minimum of time and effort.

The above objects are attained by this invention by providing a pallet assembly comprising spaced longitudinal stringers, transverse boards, and an arrangement of notches and shoulders to hold the stringers and boards in interlocked relationship.

DESCRIPTION OF THE FIGURES

FIG. 1 is a perspective view of the pallet assembly.
FIG. 2 is a perspective view of a stringer of FIG. 1.
FIG. 6 is a partial perspective view of another embodiment of the pallet assembly.

DETAILED DESCRIPTION OF THE DRAWINGS

Figure 3:
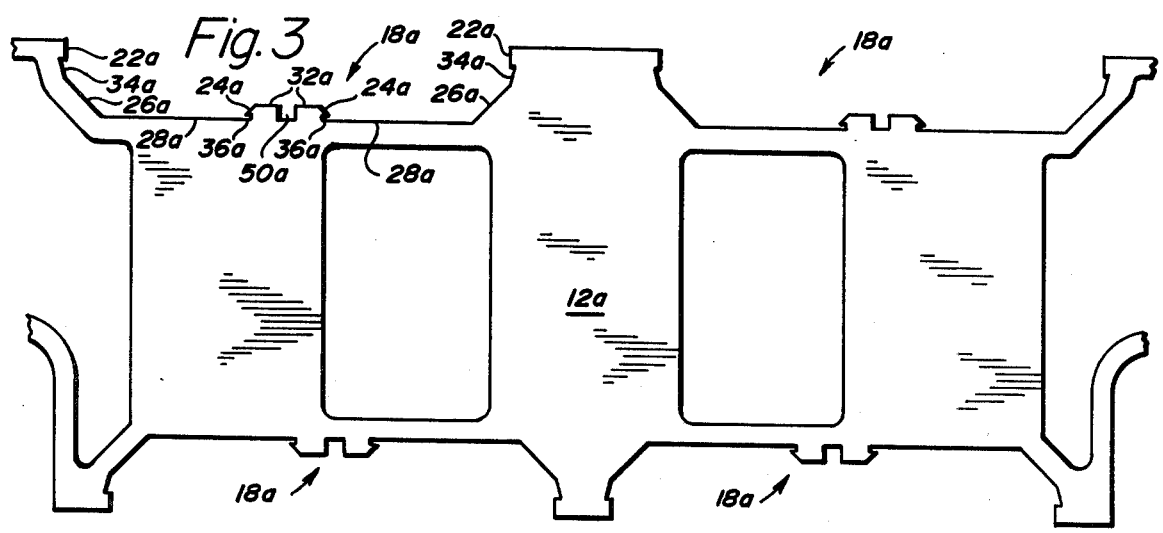
FIG. 3 is a side view of another embodiment of a stringer.

Referring to FIG. 1, a pallet assembly 10 comprises a plurality of spaced longitudinal stringers 12 and boards 14 extending transversely thereof. The boards 14 and stringers 12 are formed from a plastic material and may be made by any method well know in the plastic forming art, e.g., injection, extrusion or rotational molding. To reduce the weight and the amount of plastic material required, a stringer 12 or board 14 may be hollow with through openings 16.

The plastic materials suitable for use in making stringers and boards of this invention include polyethylene, polypropylene; polystyrene and polyvinylchloride. The plastic materials may be solid or foamed. In addition, a reinforcing material may be added to the plastic materials.

Referring to FIG. 2, each stringer 12 includes a plurality of grooves 18 in its upper face 20. Each groove 18 includes a pair of upper and lower inwardly projecting portions or shoulders 22, 24, respectively. Upper inclined surfaces 26 extend between upper shoulder 22 and horizontal surfaces 28. Lower inclined surfaces 30 extend from lower shoulders 24 to horizontal surface 32. The upper and lower inwardly projecting portions or shoulders 22,24 form upper and lower notches or recesses 34,36, respectively.

Openings 38 are provided in the lower face of each stringer to accept the tines of a fork lift, or other lifting means, not shown. In addition, grooves 18 shaped as described above may be provided in the lower face 40 of each stringer 12 for acceptance of boards 14.

Figure 4:
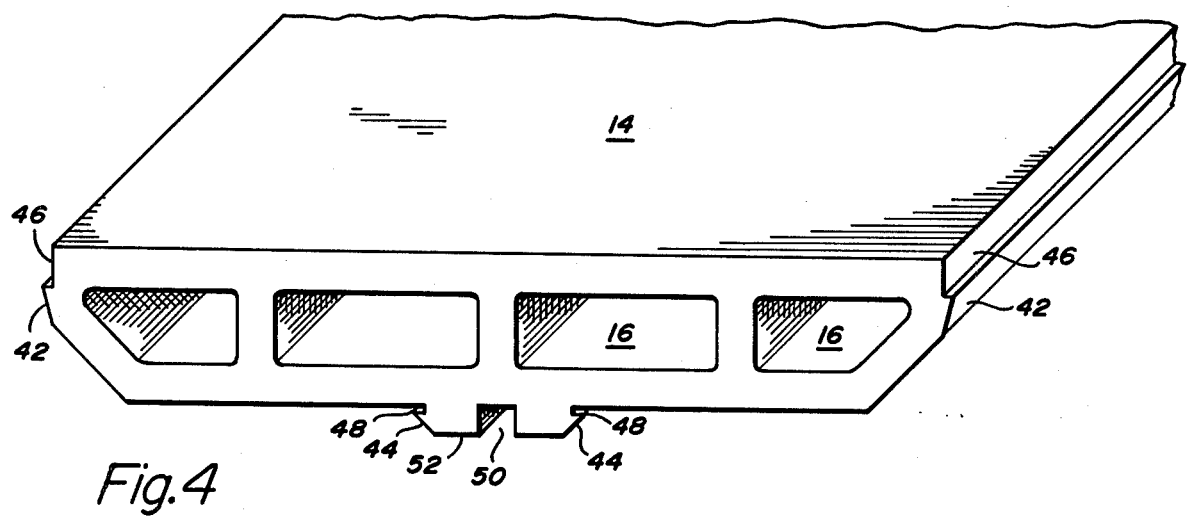
FIG. 4 is a perspective view of a board of FIG. 1.

Referring to FIG. 4, each board 14 has transverse cross section which is equivalent in size and shape to groove 18 of stringer 12 as described above and shown in FIG. 2. Thus each board 14 includes a pair of upper and lower shoulders 42,44, respectively and upper and lower recesses or notches 46,48, respectively.

In assembling the boards 14 and stringers 12 to form a pallet 10, stringers 12 are spaced as shown in FIG. 1 and the boards 14 are positioned above the grooves 18 in the stringers 12. Next, a mallet or similar driving tool may be used to force the boards 14 into the grooves 18 of the stringers 12. In so doing and since the boards 14 and stringers 12 are made of plastic, the upper and lower shoulders 42,44 of the board 14 and the upper and lower shoulders 22,24 of the stringers 12 yield in a manner to allow the shoulders 42,44 of the board 14 to be positioned in notches 34,36 of the stringer 12. In like fashion, the shoulders 22,24 of the stringer 12 become positioned in the notches 46,48 of the boatd 14. To facilitate the yielding of the shoulders 44 of the board 14 a groove 50 is provided in the lower surface 52 of the board 14.

FIG. 3 shows another embodiment of a stringer 12a wherein the stringer 12a includes a plurality of grooves 18a, each including a pair of upper shoulders 22a, a pair of lower shoulders 24a, a pair of upper recesses 34a and a pair of lower recesses 36a. Inclined surfaces 26a extend between upper shoulders 22a and horizontal surface 28a. Lower shoulders 24a are positioned above horizontal surfaces 28a and are connected at their upper side by horizontal surface 32a. To facilitate assembly, a groove 50a is provided between lower shoulders 24a.

Figure 5:
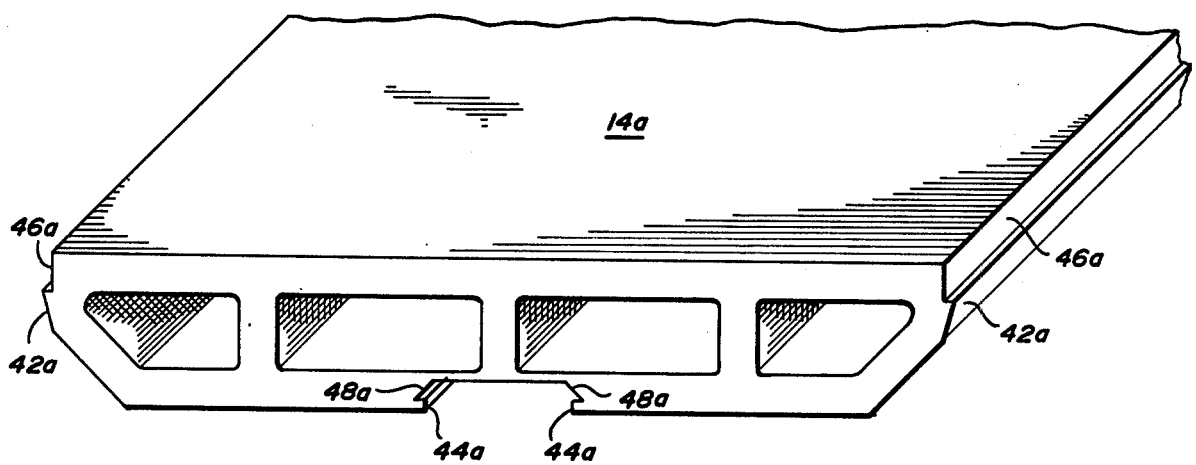
FIG. 5 is a perspective view of another embodiment of a board.

Referring to FIG. 5, each board 14a has a transverse cross section which corresponds to the shape of groove 18a of stringer 12a as described above and shown in FIG. 3. Thus each board 14a includes a pair of upper and lower shoulders 42a and 44a, respectively, and upper and lower notches 46a and 48a, respectively.

The stringers 12a and boards 14a of FIGS. 3 and 5 respectively, are assembled in the same manner as described above for the stringers 12 and boards 14 of FIG. 2 and FIG. 4, respectively. In so assembling, the shoulders 22a,24a of the stringers 12a are positioned in the notches 46a,48a, respectively, of the boards 14a while the shoulders 42a,44a of the boards 12a are positioned in the notches 34a,36a, respectively, of the stringers 12a.

FIG. 6 is a partial perspective view of another embodiment of a plastic pallet assembly comprising a plurality of boards 14b and stringers 12b. In this embodiment the boards 14b have a plurality of grooves 18b. Each groove 18b is shaped as described above for grooves 18 of FIG. 2. Each stringer 12b has a longitudinal cross section which corresponds to and is equivalent in size and shape to groove 18b of board 14b. Thus the boards 14b and stringers 12b include the plurality of shoulders and notches which interlock with each other to form a rigid plastic pallet. The assembly of the boards 14b and stringer 12b is accomplished as described above for the embodiments shown in FIG. 1. While boards 14b are shown attached to the upper and lower surfaces of stringer 12b it should be understood that the boards 14b on the lower surface may be omitted if desired.

While the boards and stringers described above include upper and lower shoulders and notches or recesses, other arrangements of shoulders and notches on the boards and stringers may be provided within the scope of this invention. For example, the lower shoulders and notches on the boards and stringers may be omitted.

We claim:

1. A plastic pallet assembly comprising a plurality of spaced longitudinal stringers, each stringer having on at least its upper surface a plurality of shoulders and notches and a plurality of boards extending transversely of the stringers and having shoulders and notches of equivalent size and shape to those of the stringer, said shoulders and notches of the stringers and boards in interlocked relationship with each other with the shoulders of the stringers positioned in the notches of the boards and the shoulders of the boards positioned in the notches of the stringers.

2. A plastic pallet assembly comprising a plurality of spaced longitudinal stringers and a plurality of boards extending transversely of the stringers, each board having a plurality of grooves including shoulders and notches, each stringer having shoulders and notches of equivalent size and shape to those of the board, said shoulders and notches of the stringers and boards in interlocked relationship with each other with the shoulders of the stringers positioned in the notches of the boards and the shoulders of the boards positioned in the notches of the stringers.

3. A plastic pallet assembly comprising a plurality of spaced longitudinal stringers, each stringer having on at least its upper surface a plurality of grooves including shoulders and notches and a plurality of boards extending transversely of the stringers and having shoulders and notches of equivalent size and shape with those of the stringer, said shoulders and notches of the stringers and boards in interlocked relationship with each other with the shoulders of the stringers positioned in the notches of the boards and the shoulders of the boards positioned in the notches of the stringers.

4. For use in a plastic pallet assembly, a stringer having on at least its upper surface shoulders and notches adapted for interlocking relationship with a board having shoulders and notches corresponding in size and shape with those of the stringer so that when in such relationship the shoulders of the stringer are positioned in the notches of the board and the shoulders of the board are positioned in the notches of the stringer.

5. For use in a plastic pallet assembly, a board having shoulders and notches adapted for interlocking relationship with a stringer having shoulders and notches corresponding in size and shape with those of the board so that when in such relationship the shoulders of the board are positioned in the notches of the stringer and the shoulders of the stringers are positioned in the notches of the board.

* * * * *